May 13, 1924.

J. E. ZANGMASTER

ICE CREAM COATING MACHINE

Filed April 1, 1922    2 Sheets-Sheet 1

1,493,512

Inventor
John E. Zangmaster
By C. C. Shepherd Attorney

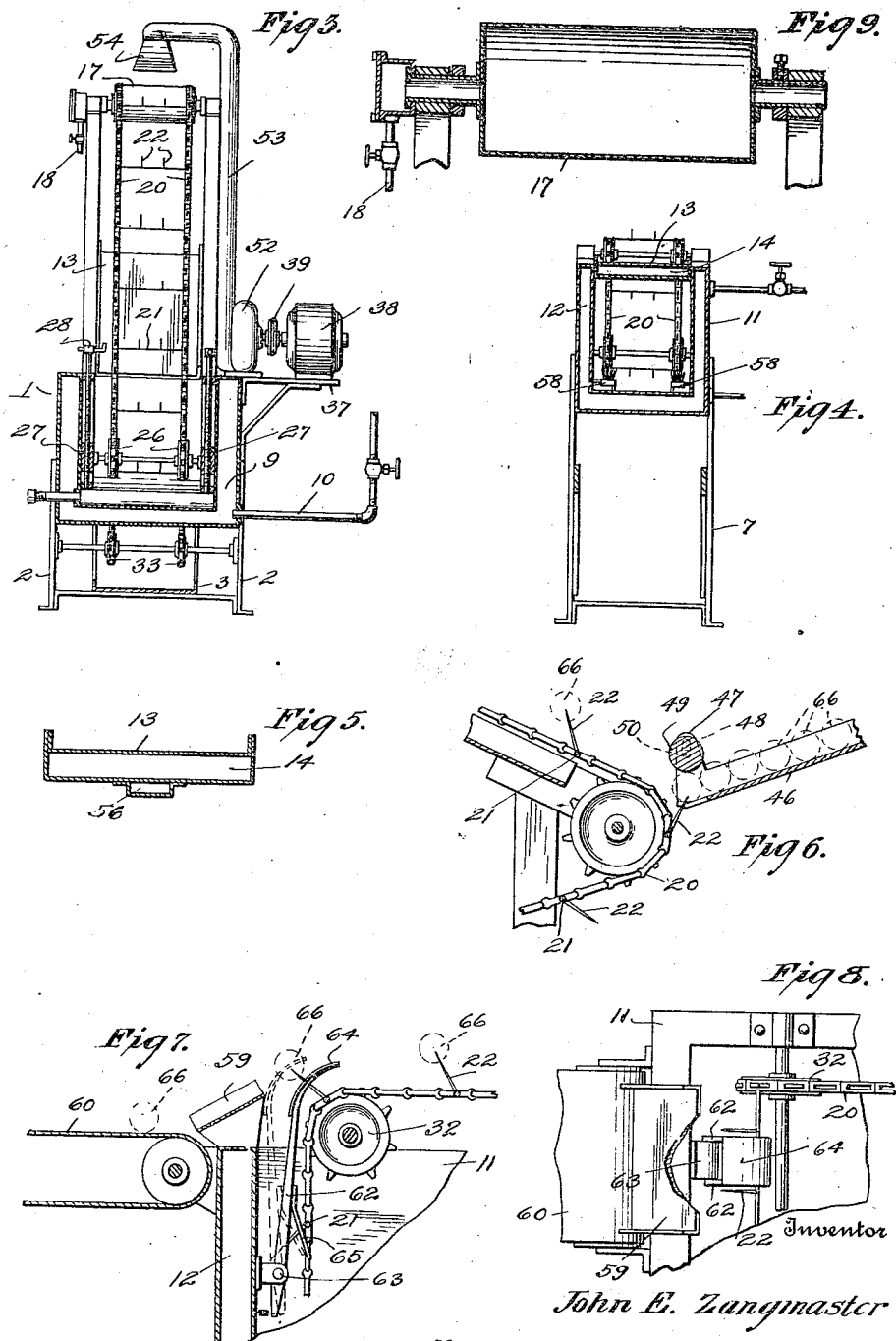

Patented May 13, 1924.

1,493,512

UNITED STATES PATENT OFFICE.

JOHN E. ZANGMASTER, OF COLUMBUS, OHIO.

ICE-CREAM-COATING MACHINE.

Application filed April 1, 1922. Serial No. 548,596.

*To all whom it may concern:*

Be it known that JOHN E. ZANGMASTER, a citizen of the United States, residing at Columbus, in the county of Franklin and State of Ohio, has invented certain new and useful Improvements in Ice-Cream-Coating Machines, of which the following is a specification.

The present invention is directed to improvements in coating machines.

The invention has for its primary object to provide a machine especially designed for coating ice cream bodies with chocolate, the coating being hardened immediately after the bodies have been subjected to the liquid coating of chocolate.

A further object of the invention is to provide a machine of this nature having means associated therewith to prevent the coating from adhering to the endless chain conveyor.

Still another object of the invention is to provide means for heating the coating material to a sufficient degree, and also to keep the conveyor cleaning material in a proper liquid state.

Still another object of the invention is to provide novel means for positively positioning the bodies in such relationship that they will enter the machine successively and in proper order.

Another object of the invention is to provide novel means for discharging the coated bodies from the machine.

With these and other objects in view, as will appear as the description proceeds, the invention consists in the novel features of construction, combinations of elements and arrangements of parts, and hereinafter to be fully described and pointed out in the appended claims.

In the accompanying drawing:

Figure 3 is a sectional view on line 3—3 of Figure 2,

Figure 4 is a sectional view on the line 4—4 of Figure 2,

Figure 5 is a sectional view on line 5—5 of Figure 2,

Figure 6 is an enlarged detail sectional view of the receiving end of the machine, Figure 7 is an enlarged detail view of the discharge end of the machine, showing more clearly the discharging means, Figure 8 is a fragmentary top plan view of the discharge end of the machine, and Figure 9 is a vertical longitudinal sectional view through the steam heated roller.

Figure 1:
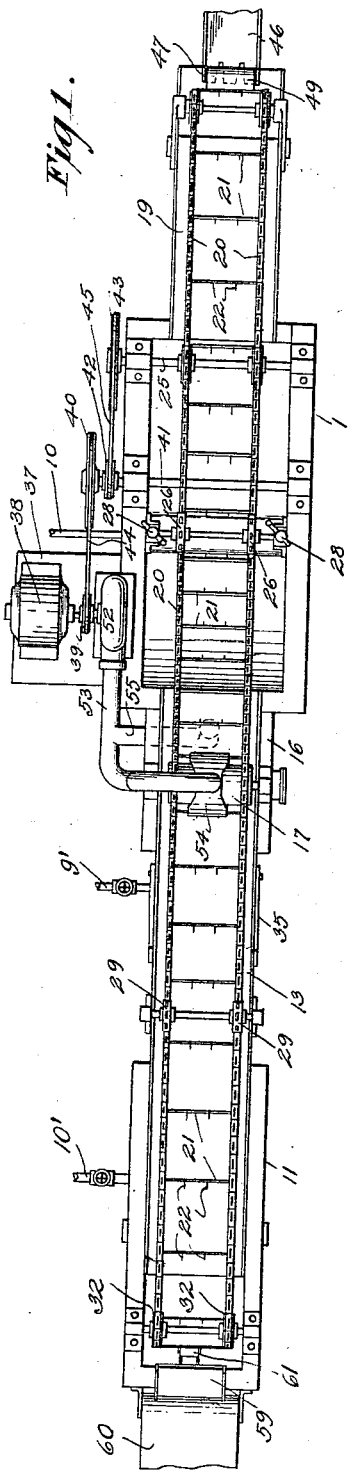
Figure 1 is a top plan view of the machine.

Referring to the drawing 1 designates a tank, which is preferably rectangular in shape and formed from any suitable sheet metal. This tank is supported by legs 2 and arranged between these legs is a pan 3, said pan having associated therewith at opposite ends pans 4 and 5, the latter being supported by legs 6, while the former is supported by a frame 7. The tank 1 is formed with a curved bottom 8 and includes a compartment 9 for introducing steam or any other suitable heating medium. The heating fluid, in this instance being steam, is controlled through the pipe 10, which leads from a suitable source of steam supply.

Aligned with the tank 1 is a tank 11, said tank being provided with a steam compartment 12. This tank is supported by the frame 7 and has its inner end resting upon the adjacent end of the pan 4.

Supported by the tanks 1 and 11 is a hollow body 13 formed from sheet metal, steam being introduced thereinto through a supply pipe 9'. Depending from the outer end of the body 1 are compartments 14 which open into the steam compartment 12 so that steam which enters through the supply pipe 10' will flow into the compartments 12 and 14, thus heating the material contained in the tank 11. Any suitable outlet for the steam may be provided for the respective tanks.

Supports 16 are provided, and are located adjacent the sides of the body 13, and rotatively supported by the upper ends of the supports 16 is a roller 17, steam being introduced thereinto, when desired through a supply pipe 18.

A conveyor 19 is employed and consists of a pair of sprocket chains 20, said chains being connected by rods 21, said rods being arranged equal distances apart and are each provided with a pair of spurs 22, the purpose of which will later appear.

The chains 20 are trained around sprocket wheels 23, which are located at the entrance end of the machine, and thence around drive sprockets 24 which are fixed to a drive shaft 25 which extends transversely of the tank 8. Mounted in the tank 8 are sprocket wheels 26 which are carried in adjustable boxes 27, said boxes being adjustable through the medium of screw shafts 28, and it will thus be seen that the tension of the conveyor 20 can be conveniently regulated.

Figure 2:
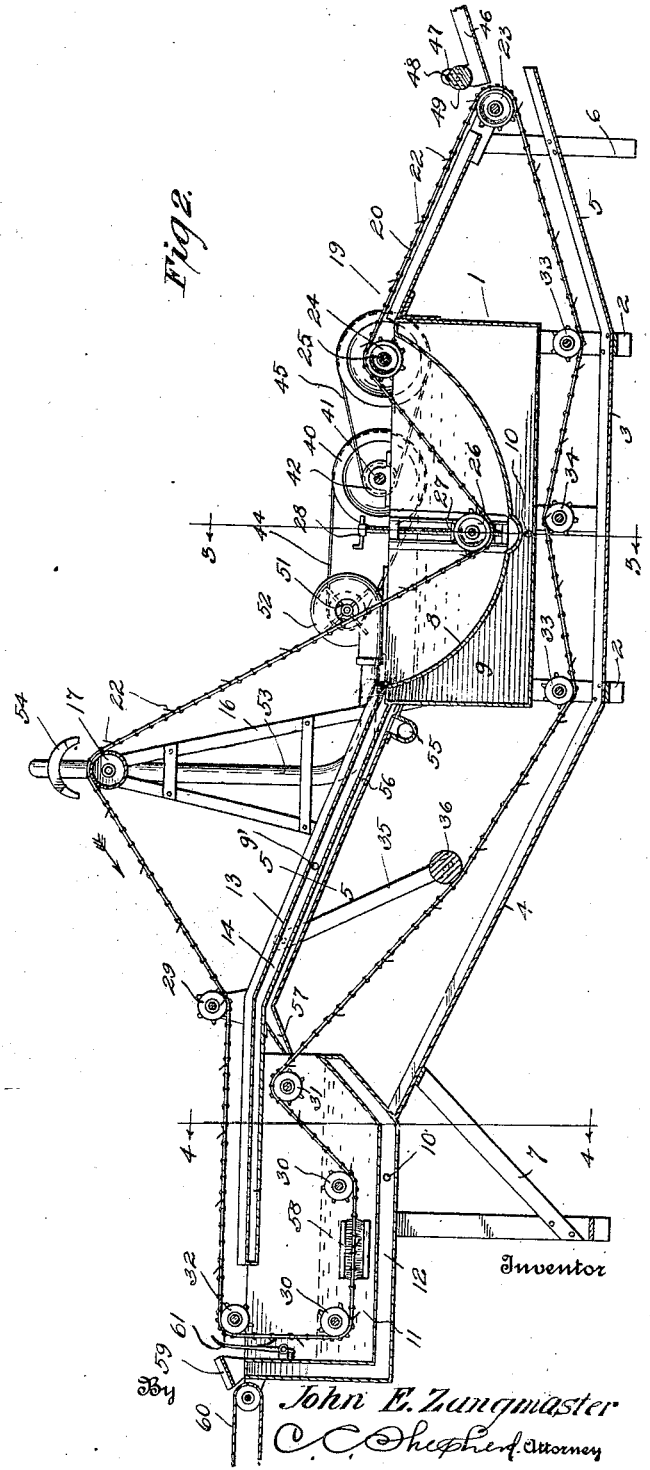
Figure 2 is a longitudinal sectional view through the same.

These chains 20, as will be seen upon reference to Figure 2 travel nearly to the bottom of the tank 8, and thence over the roller 17 carried by the supports 16, the chains then for a portion of their length are directed downwardly and under the rollers 29 which are supported by the body 13. Located in the tank 11 are sprockets 30, and arranged also in the tank 11 and adjacent the inner end thereof are sprockets 31, the chains 20 being trained around said sprockets and roller, as well as around the sprocket wheels 32 supported by the tank 11.

Supported by the outermost legs 2 are sprocket wheels 33, and arranged between these sprocket wheels are sprockets 34, and it will be noted that the chains 20 are trained around these sprockets and roller.

Supported by the body 13 are arms 35, said arms supporting a roller 36 which engages the chains 20 and serves to hold the same under the right tension.

Located adjacent the tank 1 is a stand 37 upon which is mounted an electric motor 38, said motor having its shaft provided with a pulley 39, and aligned with said pulley is a pulley 40 which is fixed to the jack shaft 41, said shaft also having a pulley 42 fixed thereto which is aligned with a pulley 43 fixed to the drive shaft 25. A belt 44 connects the pulleys 39 and 40, and imparts movement to the jack shaft 41, the movement from said shaft being imparted to the pulley 43 by a belt 45 which is trained around the pulleys 42 and 43. Thus it will be seen that the conveyor 19 is compelled to travel in the direction of the arrow, as shown in Figure 2, when the motor 38 is in motion, thus causing the conveyor to travel downwardly into the tank 8, and from thence over the roller 17, and through the tank 11.

Located adjacent the sprockets 23, or what may be termed the entrance end of the machine, is a trough 46, which is inclined downwardly, and has carried by its inner end ears 47, said ears being provided with vertical slots 48, there being a roller 49 arranged between said ears, the ends of the roller being provided with trunnions 50 which are capable of moving vertically in the slots 48.

Also connected with the motor shaft 39 is a fan 51 which is mounted in the casing 52, and leading from the casing is a pipe 53, said pipe extending upwardly adjacent one of the supports 16 and communicates with a head 54, said head being disposed immediately above the roller 17. This head is hollow and curved transversely so that air created by the fan 51 will be directed downwardly upon that portion of the conveyor which is travelling over the roller 17, the purpose of which will later appear. A branch pipe 55 leads from the pipe 53 and communicates with a channel 56 located beneath the body 13, said channel having a nozzle 57 formed upon its outer end and directed toward the tank 11, said nozzle being elongated so that air discharged therefrom will be directed upon the chains 20 as they pass from the inner end of the tank 11.

The chains 20 when passing through the tank 11 are subjected to the action of the brushes 58, which are supported in any suitable manner in said tank so as to effectively remove coating which may adhere to the chains.

A chute 59 is supported by the outer end of the tank 11 and is inclined downwardly so that articles passing therefrom will fall upon the endless belt 60, which serves to convey the coated bodies to a suitable point.

Pivotally mounted in the tank 11 is an ejector 61 which consists of lateral arms 62, the lower ends of which are pivotally connected within the tank 11, as at 63. The upper ends of these arms support a curved plate 64 which is so arranged that it will permit the travel of the spurs 22 upon opposite sides thereof. A trip arm 65 is carried by the ejector and is arranged in the path of movement of the rods 21, so that each time a rod engages the trip arm 65 the ejector will be swung to the left, as indicated in dotted lines in Figure 7 of the drawings.

The ice cream bodies 66 are preferably molded in cylindrical form, but it will be of course understood that other forms may be used, if desired.

The bodies 66 are deposited on the inclined trough 46 and pass under the roller 49, and when the conveyor 19 is in motion it is obvious that these bodies will be so positioned as to be engaged by the spurs 22, and the roller 49 is of such weight so as to hold the body in a position to be penetrated by the adjacent spurs, a continued movement of the chains will remove the body from the lower end of the trough 46. After a body has been engaged by the spurs it will be carried along with the chain and into the tank 8, where it becomes coated with the chocolate contained in said tank. Continuous travel of the chains 20 will carry the body upwardly and over the roller 17, and since this roller may be heated surplus coating on the body 66 will drip upon the body 13 and back into the tank 8. As soon as one of the bodies 66 reaches the ejector 61 the same will be tripped by the arms 65, thus swinging the ejector outwardly and causing the plate 64 to force the body from the spurs 22, whereupon the body will fall upon the chute 59, and from thence on to the conveyor belt 60.

It will be of course understood that each set of spurs will engage a body 66 so that they will be successively moved from the trough 46 and subjected to the coating action.

It is obvious that the chocolate coating, which is naturally sticky, will adhere to the conveyor, and to remove this surplus chocolate from the chain cocoa butter is placed in the tank 11, and this butter, in a melted state will in conjunction with the brushes 58 remove this coating from the chains. As the chains 20 leave the inner end of the tank 11 the air ejected from the nozzle 57 will blow any material therefrom back into the tank.

It sometimes happens that the room in which the machine is located will become warm, and in this case it will not be necessary to heat the roller 17, but it is then desirable to blow cold air upon the coated bodies, and in order to do this the head 54 has been provided.

The rods 22 are connected to the chains 20 of the conveyor 19 so that the spurs 22 will at all times remain in the same angular relation thereto, the angle being most satisfactory, being approximately 45 degrees. It will be observed that as the conveyor travels in the tank 8 that the spurs will assume a substantial horizontal position previous to passing under the sprockets 26 and in this manner the bodies 66 impaled on the spurs will not become displaced as they enter the liquid coating, but there is a tendency to more firmly impale the bodies upon the spurs as they travel downward through the coating.

The spurs 22 in their upward travel from the tank 8 will assume a substantial vertical position, eliminating any possibilities of the bodies becoming accidentally disengaged therefrom. It will be further observed that the spurs will at all times be so positioned that it is impossible for the coating from the bodies to drip therefrom during the travel of the conveyor.

Since the conveyor passes through the coating in the tank 8 a quantity of the coating will stick thereto, but as before stated, this coating is removed as the conveyor travels through the tank 11. Thus the cocoa butter will then become mixed with this coating material, and when this occurs the contents are removed from the tank 11, replenished with chocolate, and again used in the tank 8.

After the bodies 66 have passed through the tank 8 for coating, the coating is of course, not wholly hard, and will drip from the bodies, but owing to the fact that the conveyor travels upwardly and at an incline, any coating which drips from a body will not fall upon the bodies immediately below. In this manner, the coating will be perfectly even and uniform on all bodies as they leave the machine for packing. It has been found from actual practice that the chocolate coating which contains a portion of cocoa butter will become hardened in a very short time after the bodies leave the tank 8.

Since it is desired to heat the tank 8, 11, bodies 13, and roller 17, at different degrees, independent steam supplies have been provided therefor.

The pans 3, 4 and 5 are merely for catching any material which may drip from the conveyor during its travel.

What I claim is:

1. In a coating machine, the combination with a tank, of a conveyor passable therethrough, spurs associated with the conveyor and disposed in acute angular relation thereto, and means for changing the position of the spurs from a substantially horizontal position to a substantially vertical position during the travel through the tank, as and for the purpose set forth.

2. In a coating machine, the combination with a tank, for containing a liquid coating, of a conveyor passable therethrough, spurs rigidly supported by the conveyor and in acute angular relation thereto, sprockets mounted in the tank and under which the conveyor travels to compel the conveyor to travel downwardly and thence upwardly, whereby the spurs assume substantially horizontal and vertical positions during the travel of the conveyor through the tank.

3. In a coating machine, the combination with a pair of tanks, of an endless conveyor passable therethrough and common to both tanks, a roller disposed above the tanks and over which the conveyor passes, a steam-containing body associated with the tanks, said body having a channel associated therewith, a nozzle in communication with the channel and a fan blower associated with the machine for furnishing air to said nozzle and channel, as and for the purpose set forth.

4. In a coating machine, the combination with a tank, an endless conveyor passable therethrough, a steam heated body associated with the tank, an endless conveyor passable through the tank, said steam heated body having an air conducting channel associated therewith for directing air upon the conveyor as the same passes from the tank, and means for operating the conveyor.

In testimony whereof I affix my signature.

JOHN E. ZANGMASTER.